(12) United States Patent
Kim et al.

(10) Patent No.: US 10,033,032 B1
(45) Date of Patent: Jul. 24, 2018

(54) PREPARATION METHOD FOR POSITIVE ELECTRODE MATERIAL FOR SECONDARY BATTERY

(71) Applicant: KOREA INSTITUTE OF INDUSTRIAL TECHNOLOGY, Cheonan-si (KR)

(72) Inventors: Ho Sung Kim, Gwangju (KR); Byeong Su Kang, Damyanggun (KR); Sun Woo Yang, Gwangju (KR); Min Young Kim, Gwangju (KR); Chae Hwan Jeong, Gwangju (KR)

(73) Assignee: KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 43 days.

(21) Appl. No.: 15/506,443

(22) PCT Filed: Jun. 18, 2015

(86) PCT No.: PCT/KR2015/006172
§ 371 (c)(1),
(2) Date: Feb. 24, 2017

(87) PCT Pub. No.: WO2016/035985
PCT Pub. Date: Mar. 10, 2016

(30) Foreign Application Priority Data

Sep. 1, 2014 (KR) .................. 10-2014-0115611

(51) Int. Cl.
*H01M 4/13* (2010.01)
*H01M 4/1397* (2010.01)
(Continued)

(52) U.S. Cl.
CPC ............. *H01M 4/1397* (2013.01); *B01J 2/22* (2013.01); *C01B 25/45* (2013.01); *C01B 25/451* (2013.01);
(Continued)

(58) Field of Classification Search
CPC ............................. H01M 4/131; H01M 4/505
(Continued)

(56) References Cited

U.S. PATENT DOCUMENTS 7,670,721 B2 3/2010 Wurm et al.
2010/0279117 A1 11/2010 Gu
2014/0054494 A1 2/2014 Huang

FOREIGN PATENT DOCUMENTS

EP 2541655 B1 9/2017
JP 2005047751 A 2/2005
(Continued)

OTHER PUBLICATIONS

International Search Report of PCT/KR2015/006172, dated Sep. 18, 2015, English translation.
Office Action from the Japan Patent Office, dated Mar. 1, 2018.

*Primary Examiner* — Khanh Tuan Nguyen
(74) *Attorney, Agent, or Firm* — STIP Law Group, LLC

(57) ABSTRACT

Disclosed is a method of preparing a cathode electrode material for a secondary battery, including a hydrate precursor preparation step of preparing a manganese phosphate hydrate precursor using a coprecipitation process, a synthetic powder preparation step of preparing a synthetic powder by mixing the manganese phosphate hydrate precursor in a powder form with lithium phosphate and carbon, an oxide material powder preparation step of preparing a lithium manganese phosphate oxide material powder by milling and annealing the synthetic powder, a composite powder preparation step of preparing a composite powder by mixing the lithium manganese phosphate oxide material (Continued)

powder with a $Li_2MnO_3$-based cathode material, and a slurry preparation step of preparing a slurry by mixing the composite powder with a conductor and a binder.

6 Claims, 5 Drawing Sheets

(51) Int. Cl.
| | |
|---|---|
| *C01B 25/45* | (2006.01) |
| *H01M 4/58* | (2010.01) |
| *H01M 4/62* | (2006.01) |
| *H01M 4/04* | (2006.01) |
| *H01M 10/052* | (2010.01) |
| *B01J 2/22* | (2006.01) |
| *H01M 4/02* | (2006.01) |

(52) U.S. Cl.
CPC ....... *H01M 4/0433* (2013.01); *H01M 4/0471* (2013.01); *H01M 4/5825* (2013.01); *H01M 4/62* (2013.01); *H01M 10/052* (2013.01); *H01M 2004/028* (2013.01); *H01M 2220/30* (2013.01)

(58) Field of Classification Search
USPC ......................................................... 429/217
See application file for complete search history.

(56) References Cited

FOREIGN PATENT DOCUMENTS

| | | |
|---|---|---|
| JP | 2007-048612 A | 2/2007 |
| JP | 2007-119304 A | 5/2007 |
| JP | 2013520783 A | 6/2013 |
| JP | 2013197091 A | 9/2013 |
| KR | 10-2010-0117895 A | 11/2010 |
| KR | 1020110063375 A | 6/2011 |
| KR | 10-2010-0132698 A | 7/2011 |
| KR | 1020130043949 A | 5/2013 |
| KR | 10-2011-0127265 A | 6/2013 |
| KR | 10-2013-0107597 A | 10/2013 |
| KR | 1020140064339 A | 5/2014 |
| WO | WO2013038516 A1 | 3/2015 |

[FIG. 1]
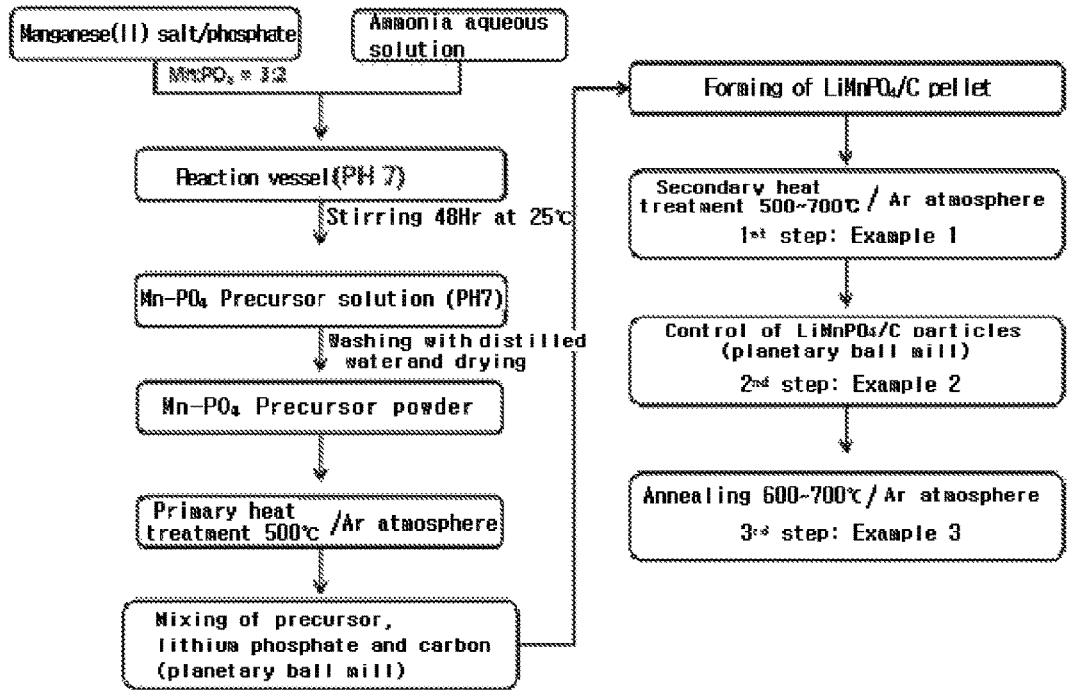
[FIG. 2]
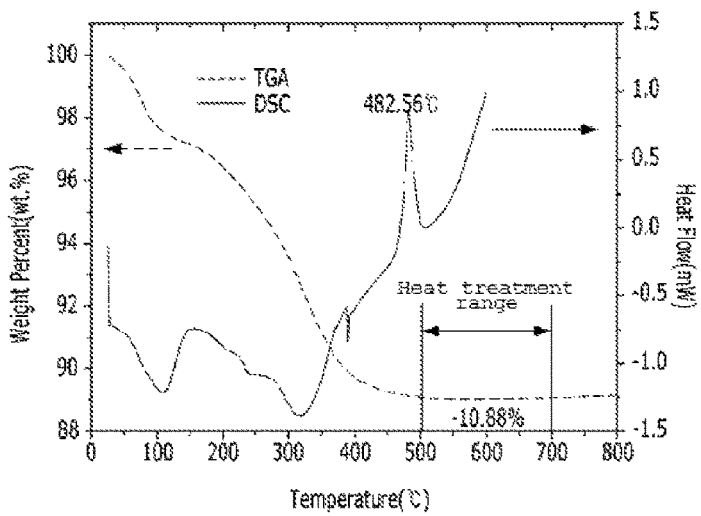

【FIG. 3】
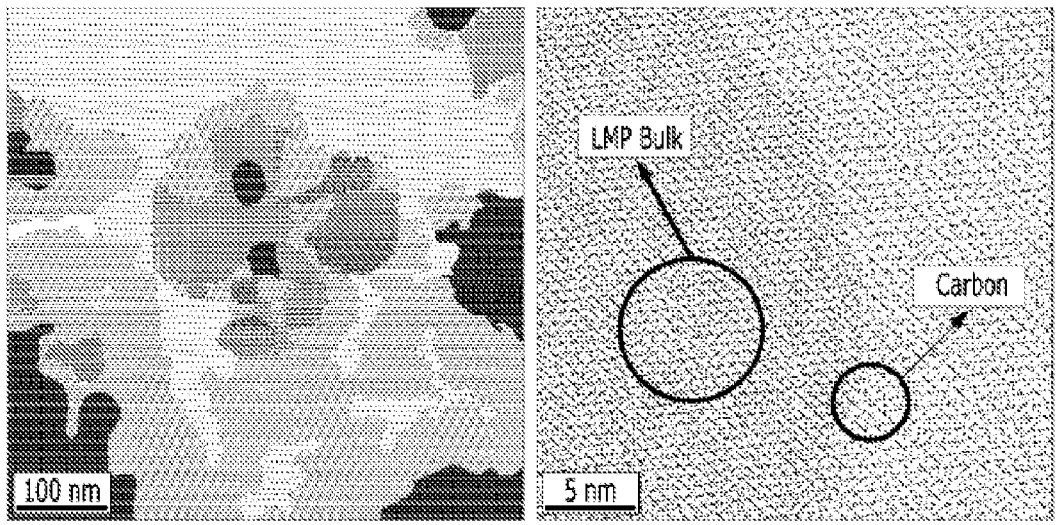
【FIG. 4】
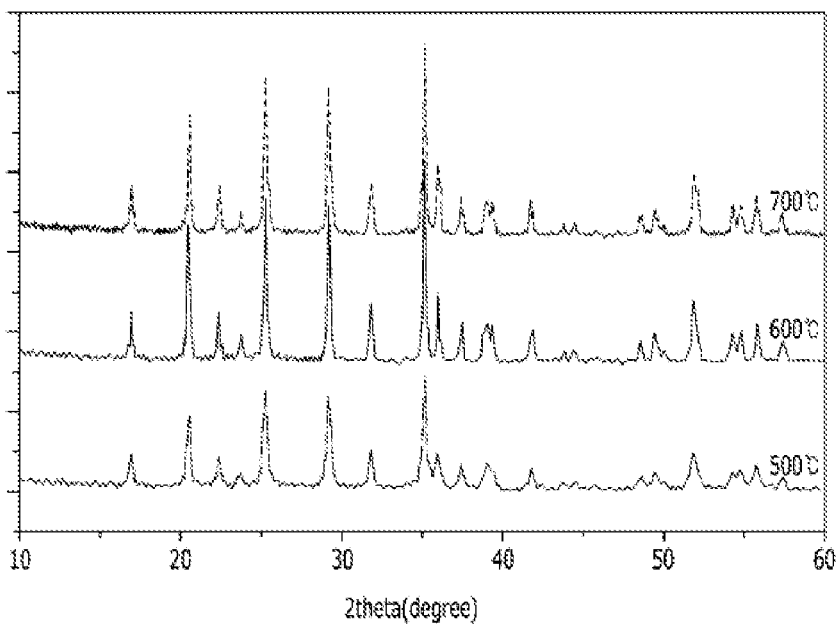

【FIG. 5】
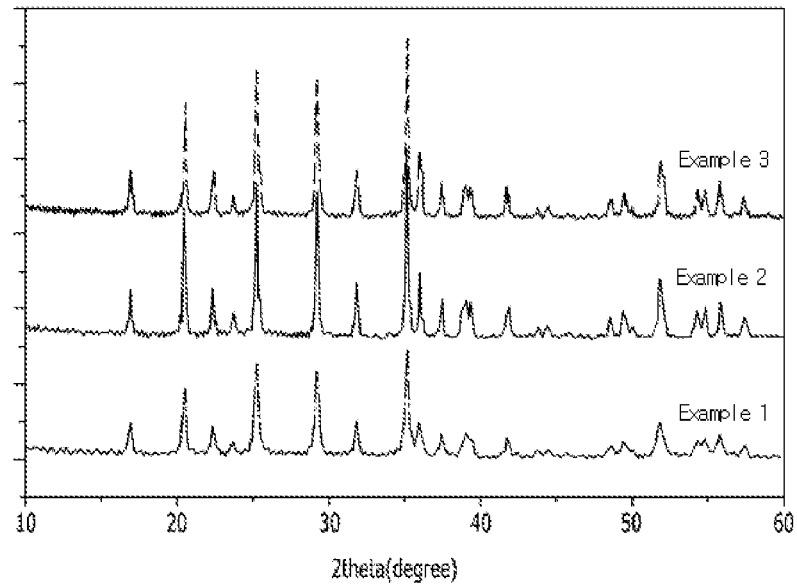
【FIG. 6】
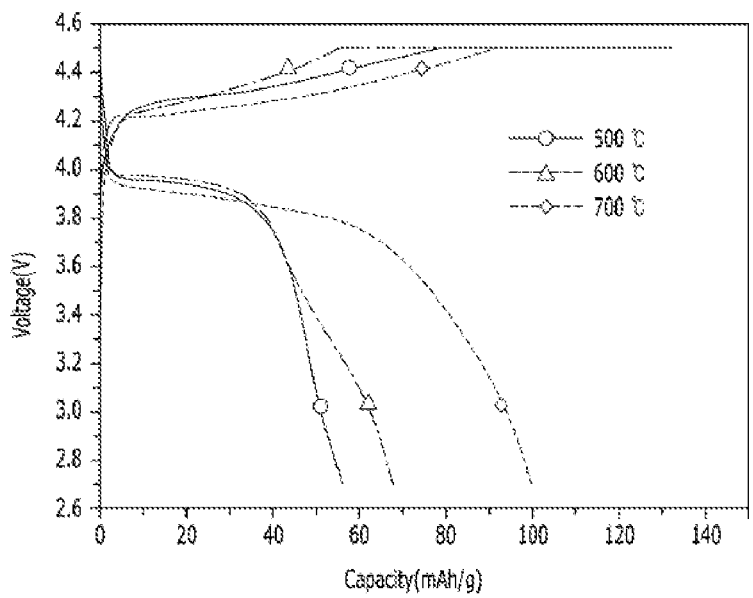

[FIG. 7]
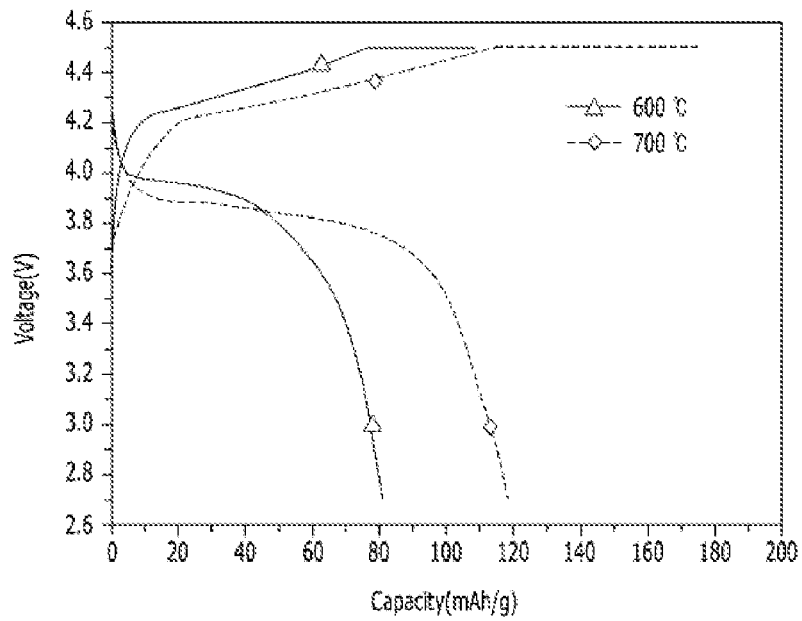
[FIG. 8]
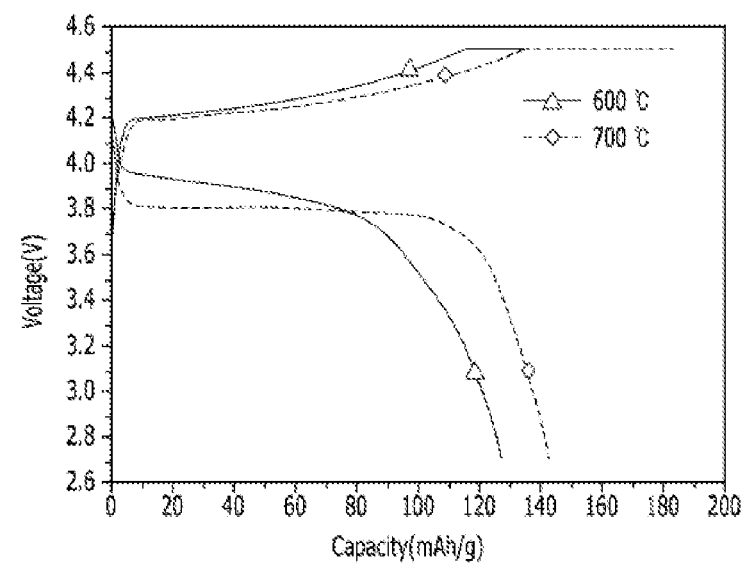

[FIG. 9]
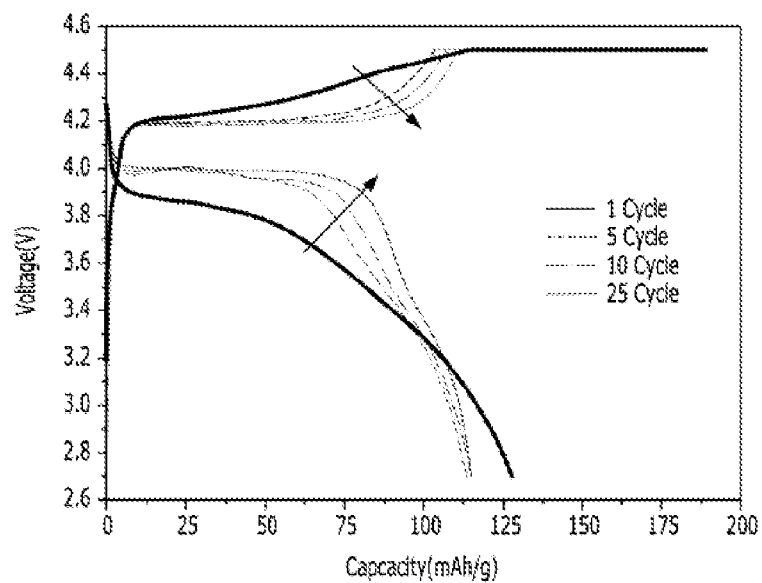
[FIG. 10]
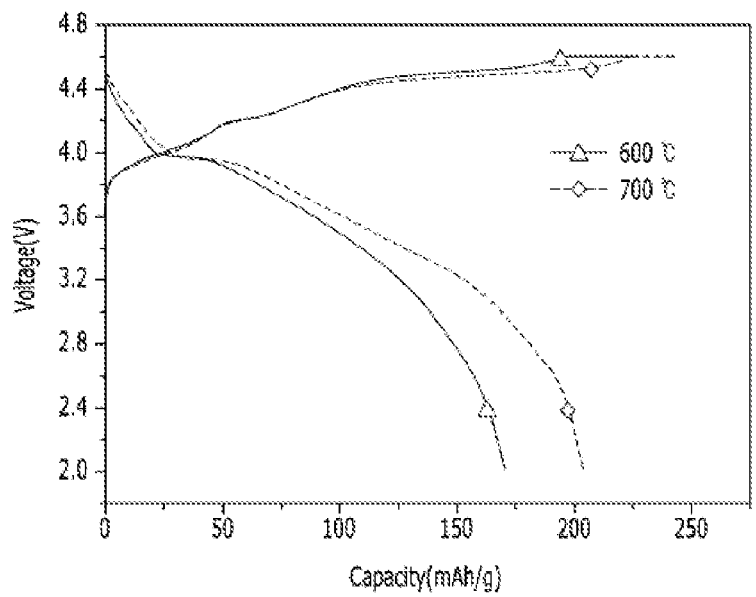

PREPARATION METHOD FOR POSITIVE ELECTRODE MATERIAL FOR SECONDARY BATTERY

CROSS-REFERENCE TO RELATED APPLICATIONS

This application is the U.S. National Phase under 35 U.S.C. § 371 of International Application No. PCT/KR2015/006172 filed on Jun. 18, 2015, which in turn claims the benefit of Korean Application No. 10-2014-0115611, filed on Sep. 1, 2014, the disclosures of which are incorporated by reference into the present application.

TECHNICAL FIELD

The present invention relates to a method of preparing a cathode material for a secondary battery, and particularly to a method of preparing a cathode material for a secondary battery, which is able to provide a cathode active material having superior reversible properties and high capacity.

BACKGROUND ART

With the drastic advancement of the electronic, communication and computer industries these days, camcorders, mobile phones, laptop PCs, etc. have made remarkable progress, and thus the demand for a lithium secondary battery is increasing as a power source for driving such devices.

The cathode active material of the lithium secondary battery mainly includes lithium cobalt oxide ($LiCoO_2$; LCO), and currently commercially available as inexpensive materials having high safety are spinel-type lithium manganese oxide ($LiMn_2O_4$; LMO), lithium composite metal oxide ($LiMn_{1/3}Co_{1/3}Ni_{1/3}O_2$; NMC) and olivine-type lithium iron phosphate oxide ($LiFePO_4$).

Among the above cathode active materials, lithium cobalt oxide (LCO) has high energy density, and is mainly used as a power source for small appliances such as mobile phones, laptop PCs, etc. due to problems with transition metal materials and stability problems, but is not suitable for use in a large lithium secondary battery for electric cars requiring higher stability.

On the other hand, spinel-type lithium manganese oxide (LMO) has a high energy density of about 120 to 140 mAh/g, and is known to exhibit excellent thermal stability of a cathode active material itself under overcharge and high voltage conditions due to the structural stability of the material, but has a structural problem in which manganese is dissolved when the battery temperature is increased to about 60° C.

Also, lithium composite metal oxide (NMC) has a high energy density of about 140 to 180 mAh/g, but is disadvantageous in terms of safety due to problems with the transition metals cobalt and nickel. Thus, such conventional materials have lower capacity than expected or are still dangerous, and are very expensive, and hence, inexpensive materials having high safety and high energy density are required in order to commercialize medium- or large-sized batteries.

Currently, a medium- or large-sized lithium secondary battery is required to exhibit high safety, a long lifetime, high energy density and cost-effectiveness, and thus an olivine-type cathode active material including iron is receiving attention. A typical olivine-type cathode active material, namely a lithium iron phosphate compound ($LiFePO_4$), is a cathode active material having superior electrical capacity of about 150 to 160 mAh/g, but has a discharge voltage of 3.2 V to 3.4 V, which is lower than those of other oxide-based cathode active materials and is thus unsuitable for use as a cathode active material for a medium- or large-sized lithium secondary battery requiring high energy density.

In contrast, the same olivine-type compound, namely a lithium manganese phosphate compound ($LiMnPO_4$), has a high discharge voltage of 3.8 V to 4.0 V, similar to those of oxide-based materials, and thorough research thereto is thus carried out in order to improve the characteristics thereof.

Japanese Patent Application Publication No. 2007-119304 discloses a method of preparing a lithium manganese phosphate compound ($LiMnPO_4$) at a low temperature under pressure through precipitation and reduction of $Mn(OH)_2$. However, the obtained lithium manganese phosphate compound ($LiMnPO_4$) cathode active material has a very low electrical capacity of about 40 mAh/g and thus poor electrochemical properties, making it impossible to use industrially.

Also, Japanese Patent Application Publication No. 2007-48612 discloses a method of preparing a lithium manganese phosphate compound ($LiMnPO_4$) by forming a material mixture and then firing the material mixture recovered through spray drying. The obtained lithium manganese phosphate compound ($LiMnPO_4$) cathode active material has an electrical capacity of 92 mAh/g at a current density of 0.25 C, and the lithium manganese phosphate compound ($LiMnPO_4$) containing 15% carbon has 130 mAh/g at a current density of 0.12 C, but the amount of the cathode active material in the cathode is excessively low, to a level of about 63%, from which the electrochemical properties of the cathode active material itself are not regarded as being sufficiently improved.

DISCLOSURE

Technical Problem

Accordingly, the present invention has been made keeping in mind the problems encountered in the related art, and the present invention is intended to provide a method of preparing a cathode material for a secondary battery, wherein the cathode active material obtained by compounding a highly crystalline nano-sized $LiMnPO_4$ material and an electrochemically inactive $Li_2MnO_3$-based cathode material exhibits superior reversible properties and has high capacity.

Technical Solution

Therefore, an embodiment of the present invention provides a method of preparing a cathode material for a secondary battery, comprising: a hydrate precursor preparation step of preparing a manganese phosphate hydrate precursor using a coprecipitation process; a synthetic powder preparation step of preparing a synthetic powder by mixing the manganese phosphate hydrate precursor in a powder form with lithium phosphate and carbon; an oxide material powder preparation step of preparing a lithium manganese phosphate oxide material powder by milling and annealing the synthetic powder; a composite powder preparation step of preparing a composite powder by mixing the lithium manganese phosphate oxide material powder with a $Li_2MnO_3$-based cathode material; and a slurry preparation step of preparing a slurry by mixing the composite powder with a conductor and a binder.

In the present invention, the hydrate precursor preparation step comprises: forming a 1 M metal solution by dissolving 1 mol of a manganese sulfate hydrate and 0.33 to 1 mol of phosphoric acid in distilled water; forming a 1 M aqueous solution by mixing ammonia water and distilled water to control a pH in a reactor; performing a coprecipitation reaction by stirring the metal solution and the aqueous solution under the condition that the pH is adjusted to 5 to 11 and a stirring rate and a temperature of the reactor are maintained constant; removing impurities by repeating water washing and filtration of a precipitate obtained through aging for 10 to 60 hr after completion of the coprecipitation reaction; and obtaining a manganese phosphate hydrate precursor by filtering and then drying the precipitate after completion of the washing for removing the impurities.

In the present invention, the synthetic powder preparation step comprises: primarily heat-treating the manganese phosphate hydrate precursor at 300° C. to 700° C. for 1 to 24 hr; mixing 1 mol of the primarily heat-treated precursor with 0.9 to 1.3 mol of lithium phosphate to give a precursor mixture, mixing 100 parts by weight of the precursor mixture containing the lithium phosphate with 18 to 33 parts by weight of carbon, and performing stirring at a predetermined stirring rate for 30 min to 6 hr; making a pellet by press-molding the stirred precursor; and secondarily heat-treating the pellet at 500° C. to 700° C. for 1 to 24 hr.

In the present invention, the oxide material powder preparation step comprises: milling the synthetic powder, obtained through the secondarily heat-treating, at a predetermined stirring rate using a planetary ball mill; and annealing the milled powder at 600° C. to 700° C. for 30 min to 2 hr in order to increase a crystallinity thereof.

In the present invention, the composite powder preparation step comprises mixing 100 parts by weight of the lithium manganese phosphate oxide material powder with 82 to 122 parts by weight of the $Li_2MnO_3$-based cathode material.

In the present invention, the slurry preparation step comprises mixing 100 parts by weight of the composite powder, 5 to 22 parts by weight of the conductor, and 5 to 22 parts by weight of the binder.

Advantageous Effects

According to the present invention, a cathode active material, obtained by compounding a highly crystalline nano-sized $LiMnPO_4$ material formed through coprecipitation and an electrochemically inactive $Li_2MnO_3$-based cathode material, can exhibit superior reversible properties and has high capacity.

DESCRIPTION OF DRAWINGS

FIG. 1 shows a process of producing a cathode material for a secondary battery according to an embodiment of the present invention;

FIG. 2 is a graph showing the results of analysis of thermal properties TGA and DSC of a lithium phosphate oxide and a precursor according to an embodiment of the present invention;

FIG. 3 shows the results of TEM of a synthetic $LiMnPO_4$ powder according to an embodiment of the present invention;

FIG. 4 is a graph showing the XRD pattern of the synthetic $LiMnPO_4$ powder depending on the heat treatment temperature in Example 1 according to the present invention;

FIG. 5 is a graph showing the XRD pattern of the precursor mixture of the present invention, subjected to heat treatment at 700° C. in Example 1, milling to a nano size in Example 2, and annealing in Example 3;

FIG. 6 is a graph showing the charge-discharge characteristics of an electrode/coin cell using the synthetic $LiMnPO_4$ powder of Example 1 according to the present invention;

FIG. 7 is a graph showing the charge-discharge characteristics of an electrode/coin cell using the synthetic $LiMnPO_4$ powder of Example 2 according to the present invention;

FIG. 8 is a graph showing the charge-discharge characteristics of an electrode/coin cell using the synthetic $LiMnPO_4$ powder of Example 3 according to the present invention;

FIG. 9 is a graph showing the charge-discharge cycling characteristics of an electrode/coin cell using the synthetic $LiMnPO_4$ powder of Example 3 according to the present invention; and FIG. 10 is a graph showing the electrochemical properties of an electrode/coin cell using the synthetic $LiMnPO_4$ powder of Example 4 according to the present invention.

BEST MODE

Hereinafter, preferred embodiments of the present invention will be described in detail with reference to the accompanying drawings so that the present invention is easily embodied by those skilled in the art to which the present invention belongs. However, in the following description of the principle of operation of the preferred embodiment of the present invention, a detailed description of known functions or configurations incorporated herein will be omitted when it may unnecessarily obscure the subject matter of the present invention.

Further, the same reference numerals are used for portions having similar functions and effects throughout the drawings.

It is also noted that in this specification, 'connected/coupled' refers to one component that may not only be directly coupled to another component but may also be indirectly coupled to another component through an intermediate component. Further, when any portion 'includes' any component, this means that the portion does not exclude other components, but may further include other components unless otherwise stated.

FIG. 1 shows the process of preparing a cathode material for a secondary battery according to an embodiment of the present invention.

According to an embodiment of the present invention, the method of preparing the cathode material for a secondary battery includes a lithium manganese phosphate material synthesis step of producing a lithium manganese phosphate ($LiMnPO_4$) material using a coprecipitation process and an electrode formation step of producing a cathode active material using the lithium manganese phosphate powder obtained through the lithium manganese phosphate material synthesis step. The lithium manganese phosphate material synthesis step includes synthesizing a manganese phosphate hydrate ($Mn_3(PO_4)_2 \cdot 6H_2O$) precursor through a coprecipitation process, heat-treating the manganese phosphate hydrate precursor, subjecting the heat-treated precursor to ball milling to a nano size and annealing, and forming a composite powder by mixing the annealed lithium manganese phosphate oxide material powder with a $Li_2MnO_3$-based cathode material ($xLi_2MnO_3$-$(1-x)LiMO_2$ ($x=0.3$, M=Ni, Mn, Co)).

Here, the manganese phosphate hydrate precursor synthesis step is performed as follows. Specifically, reactants, that is, a manganese sulfate hydrate ($MnSO_4 \cdot H_2O$) and phosphoric acid ($H_3PO_4$), are provided, and 1 mol of the manganese sulfate hydrate and 0.33 to 1 mol of phosphoric acid, and preferably, the manganese sulfate hydrate and the phosphoric acid at a molar ratio of 3:2, are dissolved in 500 ml of distilled water to give a 1 M metal solution, and in order to control the pH in the reactor, 200 ml of 5 N ammonia water, serving as a complexing agent, is mixed with 800 ml of distilled water to afford 1000 ml of a 1 mol aqueous solution.

The base material of the coprecipitation reactor has a pH of 5 to 11, and preferably a pH of 7, through mixing of ammonia water and distilled water, and the reactor is set so as to be stirred at a stirring rate of 100 rpm to 2,000 rpm, and preferably 1,000 rpm. The starting material is continuously titrated at a rate of 3 ml/min, and simultaneously, ammonia water, provided as the complexing agent, is set so as to be automatically titrated depending on changes in the pH in the reactor. Thereafter, while the stirring rate of the reactor and the reactor temperature (e.g. 20° C. to 60° C., and preferably room temperature) are maintained uniform, the metal solution and the aqueous solution are stirred so that a coprecipitation reaction occurs.

After the completion of the coprecipitation reaction through titration of the entire starting material, the stirrer of the reactor is operated in a state in which a pH of 7 is maintained through automatic titration of ammonia water, so that aging is performed for 10 to 60 hr, and preferably 48 hr. Here, the obtained precipitate is repeatedly washed with water and filtered several times, whereby impurities are removed from the precipitate. After the completion of the washing for removing impurities, the precipitate is filtered and dried in a typical oven at about 110° C. for 24 hr, thus obtaining a manganese phosphate ($MnPO_4$) hydrate precursor.

After the preparation of the manganese phosphate hydrate precursor as above, a heat treatment process is performed as follows.

The manganese phosphate hydrate precursor is subjected to primary heat treatment (a heating rate of 1 to 10° C./min) in a furnace in an argon reducing atmosphere at 300° C. to 700° C., and preferably 500° C. for 1 to 24 hr, preferably 15 hr, thus removing various impurities such as organic materials from the manganese phosphate hydrate precursor.

After the completion of the primary heat treatment in this way, 1 mol of the manganese phosphate hydrate precursor and 0.9 to 1.3 mol of lithium phosphate ($Li_3PO_4$), and preferably the manganese phosphate hydrate precursor and the lithium phosphate at a molar ratio of 1:1.1, are mixed, after which the precursor mixture containing the lithium phosphate is mixed with a carbon material. As such, 100 parts by weight of the precursor mixture containing the lithium phosphate and 18 to 33 parts by weight, and preferably 25 parts by weight, of the carbon material are mixed, and the carbon material may include any one selected from among acetylene black, Ketjen black, conductive carbon black, and sucrose.

After the mixing of the mixture containing the lithium phosphate with the carbon material, the precursor mixture including the carbon material is mixed at a stirring rate of 100 rpm to 1,000 rpm (preferably 500 rpm) for 30 min to 6 hr (preferably 3 hr) using a planetary ball mill having zirconia balls having an appropriate size received therein, and is then press-molded under a predetermined pressure (e.g. a pressure of 60 Mpa) at a predetermined temperature (e.g. room temperature) for a predetermined period of time (e.g. 30 min) using a uniaxial mold to make pellets, which are then subjected to secondary heat treatment (at a heating rate of 1 to 10° C./min, and preferably 5° C./min) in a furnace in an argon reducing atmosphere at 500° C. to 700° C. for 1 to 24 hr (preferably 10 hr), thereby synthesizing a lithium manganese phosphate ($LiMnPO_4$) material.

After the synthesis of the lithium manganese phosphate material through the heat treatment process as above, the heat-treated lithium manganese phosphate precursor is subjected to ball milling to a nano size and then to annealing, which are described below.

During the milling to a nano size and annealing of the synthetic powder, the lithium manganese phosphate oxide precursor, which is heat-treated as above, is milled at a predetermined stirring rate (e.g. 400 rpm) using a planetary ball mill having zirconia balls having an appropriate size received therein, and the milled lithium manganese phosphate powder is annealed at 600° C. to 700° C. for 30 min to 2 hr and preferably 1 hr in a furnace in an argon reducing atmosphere in order to increase crystallinity, thereby synthesizing a lithium manganese phosphate oxide material powder.

After the synthesis of the lithium manganese phosphate oxide material powder in this way, in order to improve the electrochemical activity of the lithium manganese phosphate oxide material powder, 100 parts by weight of the synthesized lithium manganese phosphate oxide material powder and 82 to 122 parts by weight, and preferably 100 parts by weight, of a $Li_2MnO_3$-based cathode material ($xLi_2MnO_3$-$(1-x)LiMO_2$ ($x=0.3$, M=Ni, Mn, Co)) are uniformly mixed, thus obtaining a composite powder.

Meanwhile, after the preparation of the lithium manganese phosphate composite powder as above, the lithium manganese phosphate composite powder, serving as a cathode active material, is mixed with a conductor at a predetermined weight ratio and transferred into a vessel of a slurry preparation mixer, after which a binder is titrated in an appropriate amount to the mixture in the vessel. Here, the synthesized cathode active material, the conductor and the binder are used in a manner in which 100 parts by weight of the synthesized cathode active material, 5 to 22 parts by weight, and preferably 12.5 parts by weight, of the conductor, and 5 to 22 parts by weight, and preferably 12.5 parts by weight, of the binder are mixed. The binder is polyvinylidene fluoride (PVDF 8 wt %).

The slurry preparation mixer is used so that the mixture is stirred at a rate of 2,000 rpm for 30 min to give a slurry, and the slurry preparation mixer is operated for 5 min, viscosity measurement is repeated five to six times, and stirring for a total of about 30 min is performed, thereby adjusting the viscosity of the slurry.

During the preparation of the slurry by stirring the mixture as mentioned above, it is important to maintain the optimal conditions so as not to change the viscosity of the mixture in the stirrer or the properties thereof due to the generation of heat upon the operation of the stirrer. In order to realize the optimal conditions, the stirring time of the slurry mixture and the kind and size of balls in the stirrer have to be optimized. In the present invention, the usage time of zirconia balls is limited to a minimum of 5 min in order to suppress changes in the properties (viscosity) of the slurry mixture in the stirrer.

The slurry thus prepared is subjected to casting on a piece of aluminum (Al) foil having a thickness of 20 μm to form a film. Here, when the slurry is manufactured in the form of a film, it is uniformly applied with a predetermined force in a predetermined direction. The electrode coated with the slurry is sufficiently dried in a typical oven at 110° C., and the thickness of the electrode is adjusted to fall within the range of 20 μm to 40 μm. The electrode is then pressed using a pressing machine (a roll press) to a final thickness of 15 μm to 30 μm, and preferably 15 μm to 20 μm.

Meanwhile, the electrode having the thickness adjusted through pressing is punched so as to be suitable for a coin cell size in a dry room, and is then sufficiently dried in a vacuum oven at 80° C. for 4 hr.

MODE FOR INVENTION

EXAMPLE 1

As reactants, 0.6 mol of $MnSO_4 \cdot H_2O$ and 0.4 mol of $H_3PO_4$ were dissolved in 500 ml of distilled water, thus preparing a 1 M metal solution, and 1 M ammonia water was provided as a complexing agent. 500 ml of distilled water was placed in a reactor, and room temperature, pH 7, and a stirring rate of 1000 rpm were set. The metal mixture was titrated at a rate of 3 ml/min, and simultaneously, ammonia water was set so as to be automatically titrated to maintain the pH in the reactor at 7. After the termination of titration, aging was performed for 48 hr, and the obtained precipitate was washed with water and filtered to remove impurities, followed by overnight drying in a typical oven at 110° C., thus preparing a manganese phosphate hydrate precursor.

The prepared precursor was subjected to primary heat treatment in an argon gas atmosphere at a heating rate of 5° C./min to 500° C. for 15 hr. The heat-treated precursor was mixed with $Li_3PO_4$ at a molar ratio of 1:1.1, and acetylene black was added in an amount of 20 wt % based on the weight of the heat-treated precursor, after which the resulting mixture was mixed at a stirring rate of 500 rpm for 3 hr using a planetary ball mill having zirconia balls having diameters of 10 mm and 5 mm mixed at a number ratio of 1:1, and then subjected to secondary heat treatment at each of 500° C., 600° C. and 700° C. for 10 hr at a heating rate of 5° C./min in an argon gas atmosphere, thus obtaining a $LiMnPO_4/C$ powder.

The synthesized cathode material, namely the powder having a secondary particle size of 50 μm or less, was used to prepare the slurry, and was also applied to manufacture an electrode and a cell. The cathode active material $LiMnPO_4/C$, a conductor, and a binder were mixed at a ratio of 80:10:10 wt % at a rate of 2,000 rpm for 30 min using a mixer, thus preparing a slurry.

The slurry thus prepared was cast in the form of a film on a piece of aluminum foil having a thickness of 20 μm, immediately after which the electrode coated with the slurry was sufficiently dried in a typical oven at 110° C. The thickness of the sufficiently dried electrode was adjusted to about 30 μm. The electrode was then pressed using a pressing machine (a roll press) to a final thickness of about 15 μm. The electrode thus pressed was punched so as to be suitable for a cell size in a dry-room atmosphere, and was then sufficiently dried in a vacuum oven at 80° C. for 4 hr.

EXAMPLE 2

An electrode was manufactured in the same manner as in Example 1, with the exception that, in order to efficiently mill the powder finally heat-treated at 600° C. and 700° C. in Example 1, a planetary ball mill having zirconia balls having appropriate sizes and conditions received therein, that is, the balls having diameters of 10 mm, 5 mm, 2 mm and 1 mm at a weight ratio of 2:1:3.3:3.3, was used, and the synthesized cathode material and the zirconia balls were provided at a weight ratio of 1:20, and thus ball milling was performed six times for 30 min each at a predetermined stirring rate (e.g. 400 rpm).

EXAMPLE 3

An electrode was manufactured in the same manner as in Example 2, with the exception that the synthesized cathode material obtained through the milling of Example 2 was additionally annealed at each of 600° C. and 700° C. for 1 hr in an argon atmosphere. As such, the annealing was performed at the same temperature as the secondary heat treatment temperature, as shown in Table 1 below.

In order to evaluate the electrochemical properties of the electrodes of Examples 1 to 3, a coin cell and a 3-electrode cell were fabricated. The coin cell was a 2032-standard coin cell, configured such that a lithium metal serving as an anode, a PE separator, and an electrolyte solution comprising 1 mol of $LiPF_6$ dissolved in a mixed solvent of ethylene carbonate (EC) and diethyl carbonate (DMC) (volume ratio of 1:1) were assembled, and the 3-electrode cell was configured such that the synthesized cathode material acted as a working electrode (WE), Li metal was used as a counter electrode (CE) and a reference electrode (RE), and the same electrolyte solution and separator as in the coin cell were used.

TABLE 1

| | Precursor and primary heat treatment | Secondary heat treatment | Ball milling | Tertiary heat treatment |
|---|---|---|---|---|
| Example 1 | Coprecipitation (pH 7), 500° C. | 500° C. | No | No |
| | | 600° C. | No | No |
| | | 700° C. | No | No |
| Example 2 | The same | 600° C. | Yes | No |
| | | 700° C. | Yes | No |
| Example 3 | The same | 600° C. | Yes | Yes (600° C.) |
| | | 700° C. | Yes | Yes (700° C.) |

The thermal properties of the mixture of the $MnPO_4$ precursor, obtained through coprecipitation of the present invention, and the lithium source (lithium phosphate) in the Examples were measured. As shown in FIG. 2, an exothermic peak was observed at about 480° C., and further weight reduction did not occur at 500° C. or more but crystallization progressed. That is, taking into consideration the crystallization of the synthetic powder of the present invention and the properties of the nanoparticles, heat treatment is preferably carried out in the temperature range of 500° C. to 700° C.

When the heat treatment was performed at 600° C., as in Example 1, the synthetic $LiMnPO_4$ powder was configured such that the primary particles were aggregated as shown in the left of FIG. 3, the particle size being about 60 nm to 100 nm, and the bulk portion of the particles and the portion coated with carbon to a thickness of about 2 nm to 5 nm were observed, as shown in the right of FIG. 3.

In Example 1, the mixture of the $MnPO_4$ precursor obtained through coprecipitation and the lithium source (lithium phosphate) was heat-treated at each of 500° C., 600° C. and 700° C., as shown in FIG. 4, and the XRD pattern of each sample was analyzed. The mixture was determined to be an orthorhombic crystal structure of a Pnma space group, and there were no great changes in lattice constant depending on the heat treatment temperature, but the crystallite size and crystallinity varied, as seen in Table 2 below. As the heat treatment temperature was increased from 500° C. to 700° C., the crystallite size and crystallinity were increased, but became similar at heat treatment temperatures of 600° C. and 700° C.

TABLE 2

| Example 1 | Crystallite size (nm) | Crystallinity (%) |
|---|---|---|
| 500° C. | 30.44 | 89.33 |
| 600° C. | 64.14 | 94.30 |
| 700° C. | 62.63 | 94.34 |

Based on the results of analysis of XRD pattern of the powder heat-treated at 700° C. (Example 1), the powder (Example 2) obtained by subjecting the powder under the same conditions as Example 1 to planetary ball milling, and the powder (Example 3) obtained by annealing the powder of Example 2 at the same temperature, as shown in FIG. 5, no external changes in peak appear, but in Example 2, the main peaks were relatively wide. As for the crystallite size and crystallinity based on Rietveld analysis, the powder particles were milled to a nano size using a planetary ball mill and became non-crystalline (i.e. amorphous), and thus, as shown in Table 3 below, the crystallite size and crystallinity were reduced in the powder (Example 2) obtained by subjecting the powder under the same conditions as Example 1 to planetary ball milling, compared to the powder heat-treated at 700° C. (Example 1). As is apparent from Table 3, the powder heat-treated at 700° C. had a crystallite size of 62.63 and a crystallinity of 94.34%, but the crystallite size and crystallinity of the powder subjected to planetary ball milling (Example 2) were decreased to 29.93 and 83.39%, respectively. Also, when the powder (Example 2) obtained by subjecting the powder under the same conditions as Example 1 to planetary ball milling was annealed at 700° C., as shown in Table 3, the crystallite size and crystallinity of Example 3 were 47.33 and 93.16%, respectively, which are higher than Example 2.

TABLE 3

| Sample | Crystallite size (nm) | Crystallinity (%) |
|---|---|---|
| Example 1 | 62.63 | 94.34 |
| Example 2 | 29.93 | 83.39 |
| Example 3 | 47.33 | 93.16 |

Meanwhile, the powder of Example 1, heat-treated at each of different heat treatment temperatures, was fabricated into an electrode/coin cell, and the charge-discharge performance thereof was measured under conditions of CV/CC=4.5V, 0.05 C/0.02 C charge, and 0.05 C discharge. As shown in FIG. 6, the capacity of each sample was 58 mAh/g at a heat treatment temperature of 500° C., 69 mAh/g at 600° C., and 100 mAh/g at 700° C., and the voltage was maintained at about 3.9 V. Accordingly, the cathode material powder manufactured according to the present invention exhibited the greatest capacity at 700° C., at which crystallinity, rather than the crystallite size, was stably maintained at a high level.

The powder of Example 2 was fabricated into an electrode/coin cell, and the charge-discharge performance thereof was measured under conditions of CV/CC=4.5V, 0.05 C/0.02 C charge, and 0.05 C discharge. As shown in FIG. 7, both the powder at 600° C. and the powder at 700° C. were increased in capacity compared to Example 1. That is, the capacity of the powder at 600° C. of Example 1 was 69 mAh/g, but the capacity of the powder at 600° C. of Example 2 was 81 mAh/g, and the capacity of the powder at 700° C. of Example 1 was 100 mAh/g, but the capacity of the powder at 700° C. of Example 2 was 120 mAh/g. The reason why the capacity was increased as above is that, as illustrated in FIG. 5, the crystallite size is decreased through ball milling, thus improving performance but decreasing crystallinity, whereby limitations are imposed on increasing the capacity.

The powder of Example 3, obtained by annealing each of the powder at 600° C. and the powder at 700° C. of Example 2, subjected to planetary ball milling, at 600° C. and 700° C., was fabricated into an electrode/coin cell, and the charge-discharge performance thereof was measured under conditions of CV/CC=4.5V, 0.05 C/0.02 C charge, and 0.05 C discharge. As shown in FIG. 8, the powder at 600° C. and the powder at 700° C. had capacities of 130 mAh/g and 145 mAh/g, respectively, and the discharge potential was 3.9 V at 600° C., and a flat potential of 3.8 V was obtained at 700° C. In particular, the powder at 700° C. exhibited not only superior discharge capacity but also a flat discharge voltage range, which was very long and stable.

On the other hand, the powder of Example 3, annealed at 700° C., was fabricated into an electrode and a coin cell, and the cycling characteristics thereof were measured under conditions of CV/CC=4.5V, 0.05 C/0.02 C charge, and 0.1 C discharge. As shown in FIG. 9, a capacity of about 127 mAh/g was obtained at a discharge capacity of 0.1 C. When the discharge current density was increased from 0.05 C to 0.1 C, about 90% of the capacity at the discharge current density of 0.05 C was obtained. In the case where 25 cycles were maintained under the above conditions, the charge voltage was decreased and the discharge voltage was increased depending on the number of cycles. When 25 cycles were maintained, the discharge voltage was set to about 4.0V, and the discharge capacity was not decreased, but was maintained stable.

EXAMPLE 4

An electrode was manufactured in the same manner as in Example 3, with the exception that the composite powder, comprising the synthesized cathode active material annealed at each of 600° C. and 700° C. in Example 3 and the $Li_2MnO_3$-based oxide at a weight ratio of 50:50 (wt %), was used, and the thickness of the electrode was adjusted to about 20 μm.

In order to evaluate the electrochemical properties of the electrode of Example 4, a coin cell and a 3-electrode cell were fabricated. As such, the coin cell was a 2032-standard coin cell configured such that a lithium metal serving as an anode, a PE separator, and an electrolyte solution comprising 1 mol of $LiPF_6$ dissolved in a mixed solvent of ethylene carbonate (EC) and diethyl carbonate (DMC) (volume ratio 1:1) were assembled, and the 3-electrode cell was manufactured in a manner in which the synthesized cathode material was used as a working electrode (WE), Li metal acted as a counter electrode (CE) and a reference electrode (RE), and the same electrolyte solution and separator as in the coin cell were used.

The composite cathode material comprising the synthetic powder annealed at each of 600° C. and 700° C. and the $Li_2MnO_3$-based cathode material at a weight ratio of 1:1 was fabricated into an electrode and a coin cell, and the charge-discharge performance thereof was measured under conditions of CV/CC=4.6V, 0.05 C/0.02 C charge, and 0.05 C discharge. As shown in FIG. 10, the powder at 600° C. and the powder at 700° C. had high capacities of 175 mAh/g and 205 mAh/g, respectively. However, as shown in FIG. 10, the discharge voltage (i.e. average about 3.6 V) was very different from that of the pure phosphate-based $LiMnPO_4$, and the total energy density was increased by about 30% compared to the powder at 700° C. of Example 2. That is, the energy density of the powder at 700° C. of Example 2 was 551 Wh/g (145 mAh/g×3.8 V), but the energy density of the powder at 700° C. of Example 4 was 718 Wh/g (205 mAh/g×3.5 V), representing an increase of about 30%.

The method of manufacturing the cathode material for a secondary battery according to the embodiment of the present invention includes forming a highly crystalline nano-sized $LiMnPO_4$ material through coprecipitation and then compounding the highly crystalline nano-sized $LiMnPO_4$ material with an electrochemically inactive $Li_2MnO_3$-based cathode material, thereby providing an excellent cathode active material having an energy density ranging from a minimum of 551 Wh/g to a maximum of 718 Wh/g.

While the present invention has been described in connection with what is presently considered to be the most practical and preferred embodiment, it is to be understood that the invention is not limited to the disclosed embodiments. It will be apparent to those skilled in the art that various modifications and variations can be made in the present invention without departing from the spirit of the invention. Therefore, the scope of the present invention should not be limited to the embodiments described, but should be defined by the following claims as well as equivalents thereof.

INDUSTRIAL APPLICABILITY

As described above, according to the present invention, a highly crystalline nano-sized $LiMnPO_4$ material is formed through coprecipitation and is then compounded with an electrochemically inactive $Li_2MnO_3$-based cathode material, whereby the cathode active material can exhibit superior reversible properties and high capacity.

The invention claimed is:

1. A method of preparing a cathode material for a secondary battery, comprising:
 a hydrate precursor preparation step of preparing a manganese phosphate hydrate precursor using a coprecipitation process;
 a synthetic powder preparation step of preparing a synthetic powder by mixing the manganese phosphate hydrate precursor in a powder form with lithium phosphate and carbon;
 an oxide material powder preparation step of preparing a lithium manganese phosphate oxide material powder by milling and annealing the synthetic powder;
 a composite powder preparation step of preparing a composite powder by mixing the lithium manganese phosphate oxide material powder with a $Li_2MnO_3$-based cathode material; and
 a slurry preparation step of preparing a slurry by mixing the composite powder with a conductor and a binder.

2. The method of claim 1, wherein the hydrate precursor preparation step comprises:
 forming a 1 M metal solution by dissolving 1 mol of a manganese sulfate hydrate and 0.33 to 1 mol of phosphoric acid in distilled water;
 forming a 1 M aqueous solution by mixing ammonia water and distilled water to control a pH in a reactor;
 performing a coprecipitation reaction by stirring the metal solution and the aqueous solution under a condition that the pH is adjusted to 5 to 11 and a stirring rate and a temperature of the reactor are maintained constant;
 removing impurities by repeating water washing and filtration of a precipitate obtained through aging for 10 to 60 hr after completion of the coprecipitation reaction; and
 obtaining a manganese phosphate hydrate precursor by filtering and then drying the precipitate after completion of the water washing for removing the impurities.

3. The method of claim 1, wherein the synthetic powder preparation step comprises:
 primarily heat-treating the manganese phosphate hydrate precursor at 300° C. to 700° C. for 1 to 24 hr;
 mixing 1 mol of the primarily heat-treated precursor with 0.9 to 1.3 mol of lithium phosphate to give a precursor mixture, mixing 100 parts by weight of the precursor mixture containing the lithium phosphate with 18 to 33 parts by weight of carbon, and performing stirring at a predetermined stirring rate for 30 min to 6 hr;
 making a pellet by press-molding the stirred precursor; and
 secondarily heat-treating the pellet at 500° C. to 700° C. for 1 to 24 hr.

4. The method of claim 3, wherein the oxide material powder preparation step comprises:
 milling the synthetic powder, obtained through the secondarily heat-treating, at a predetermined stirring rate using a planetary ball mill; and
 annealing the milled synthetic powder at 600° C. to 700° C. for 30 min to 2 hr in order to increase a crystallinity thereof.

5. The method of claim 1, wherein the composite powder preparation step comprises mixing 100 parts by weight of the lithium manganese phosphate oxide material powder with 82 to 122 parts by weight of the $Li_2MnO_3$-based cathode material.

6. The method of claim 1, wherein the slurry preparation step comprises mixing 100 parts by weight of the composite powder, 5 to 22 parts by weight of the conductor, and 5 to 22 parts by weight of the binder.

* * * * *